United States Patent
Nandi et al.

(10) Patent No.: US 11,341,983 B2
(45) Date of Patent: May 24, 2022

(54) SYSTEM AND METHOD FOR AUDIO NOISE REDUCTION

(71) Applicant: Honeywell International Inc., Morris Plains, NJ (US)

(72) Inventors: Akash Nandi, Bangalore (IN); Showvik Chakraborty, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 617 days.

(21) Appl. No.: 16/133,010

(22) Filed: Sep. 17, 2018

(65) Prior Publication Data

US 2020/0090676 A1    Mar. 19, 2020

(51) Int. Cl.
| | |
|---|---|
| *G10L 15/18* | (2013.01) |
| *G10L 21/0264* | (2013.01) |
| *G06N 3/02* | (2006.01) |
| *G10L 15/06* | (2013.01) |
| *G10L 25/18* | (2013.01) |
| *G10L 25/21* | (2013.01) |

(Continued)

(52) U.S. Cl.
CPC ............ *G10L 21/0264* (2013.01); *G06N 3/02* (2013.01); *G10L 15/063* (2013.01); *G10L 25/18* (2013.01); *G10L 25/21* (2013.01); *G10L 25/30* (2013.01); *G10L 25/84* (2013.01)

(58) Field of Classification Search
CPC . G10L 25/30; G10L 21/0208; G10L 21/0232; G10L 2021/02165; G10L 21/02; G10L 21/0216; G10L 21/038; G10L 25/27; G10L 25/45; G10L 25/51; G10L 25/78; G10L 25/81; G10L 25/87

USPC ....................................................... 704/226
See application file for complete search history.

(56) References Cited

U.S. PATENT DOCUMENTS

| | | |
|---|---|---|
| 9,064,498 B2 | 6/2015 | Uhle et al. |
| 9,305,530 B1 | 4/2016 | Durham et al. |

(Continued)

FOREIGN PATENT DOCUMENTS

| | | |
|---|---|---|
| CN | 103489445 A | 1/2014 |
| CN | 104916288 A | 9/2015 |
| CN | 107886943 A | 4/2018 |

OTHER PUBLICATIONS

H. Pulakka, U. Remes, S. Yrttiaho, K. Palomaki, M. Kurimo and P. Alku, "Bandwidth Extension of Telephone Speech to Low Frequencies Using Sinusoidal Synthesis and a Gaussian Mixture Model," in IEEE Transactions on Audio, Speech, and Language Processing, vol. 20, No. 8, pp. 2219-2231, Oct. 2012, doi: 10 (Year: 2012).*

(Continued)

*Primary Examiner* — Bharatkumar S Shah
(74) *Attorney, Agent, or Firm* — Fogg & Powers LLC

(57) ABSTRACT

A system is provided. The system comprises at least one artificial neural network configured to: receive an audio signal; for a time period, determine if at least one human voice audio spectrum is in the audio signal; for the time period, identify at least one human voice audio power spectrum; for the time period, extract each of the at least one identified human voice audio power spectrum; remove artifacts from each extracted human voice audio power spectrum to synthesize an estimation of an original human voice prior to its distortion; and transmit the synthesized estimation of an original human voice.

20 Claims, 3 Drawing Sheets

(51) Int. Cl.
*G10L 25/30* (2013.01)
*G10L 25/84* (2013.01)

(56) References Cited

U.S. PATENT DOCUMENTS

| | | | |
|---|---|---|---|
| 9,442,496 | B1 | 9/2016 | Beckman et al. |
| 9,640,194 | B1 | 5/2017 | Nemala et al. |
| 9,978,388 | B2 | 5/2018 | Avendano et al. |
| 10,152,970 | B1* | 12/2018 | Olabiyi .................. G06N 3/006 |
| 2004/0167777 | A1* | 8/2004 | Hetherington ...... G10L 21/0208 |
| | | | 704/226 |
| 2016/0078880 | A1* | 3/2016 | Avendano ............... G10L 21/02 |
| | | | 704/202 |
| 2017/0061978 | A1 | 3/2017 | Wang et al. |

OTHER PUBLICATIONS

Belaish, Eran, et al. "Voice Isolation: When Noise Reduction Meets Deep Learning"; EE Times Connection the Global Electronics Community; Jan. 4, 2016; pp. 1-7.

Falk, Tiago H., et al. "Single-Ended Speech Quality Measurement Using Machine Learning Methods"; Nov. 2006; IEE Transactions on Audio, Speech, and Language Processing, vol. 14, No. 6; pp. 1935-1947.

Valin, Jean-Marc, "RNN Noise: Learning Noise Suppression", "https://people.xiph.org/~jm/demo/mnoise/", "Mozilla Emerging Technologies", Dated Sep. 27, 2017, Retrieved Jun. 14, 2018, pp. 1-6, Publisher: Mozilla and Xiph.org.

Donahue et al., "Exploring Speech Enhancement with Generative Adversarial Networks for Robust Speech Recognition", International Conference on Acoustics, Speech and Signal Processing (ICASSP), Apr. 2018, pp. 5024-5028, IEEE.

European Patent Office, "Extended European Search Report from EP Application No. 19197634.9" from Foreign Counterpart to U.S. Appl. No. 16/133,010, dated Nov. 8, 2019, pp. 1-11, Published: EP.

Gao et al., "Improving Deep Neural Network Based Speech Enhancement in Low SNR Environments", Latent Variable Analysis and Signal Separation: 12th International Conference, Aug. 25-28, 2015, pp. 75-82.

Park et al., "A Fully Convolutional Neural Network for Speech Enhancement", Sep. 22, 2016, pp. 1-6.

Sertsi et al., "Robust Voice Activity Detection Based on LSTM Recurrent Neural Networks and Modulation Spectrum", Proceedings of APSIPA Annual Summit and Conference, Dec. 12-15, 2017, pp. 342-346, APSIPA ASC.

Xu et al., "A Regression Approach to Speech Enhancement Based on Deep Neural Networks", IEEE/ACM Transactions on Audio, Speech and Language Processing, 2013, pp. 1-13, IEEE.

Zhang et al., "Deep Learning for Environmentally Robust Speech Recognition: An Overview of Recent Developments", Sep. 21, 2018, pp. 1-16.

European Patent Office, "Summons to attend oral proceedings pursuant to Rule 115(1) EPC from EP Application No. 19197634.9", from Foreign Counterpart to U.S. Appl. No. 16/133,010, dated May 4, 2021, pp. 1 through 10, Published: EP.

European Patent Office, "Communication pursuant to Article 94(3) EPC from EP Application No. 19197634.9", from Foreign Counterpart to U.S. Appl. No. 16/133,010, dated Jun. 18, 2020, pp. 1 through 8, Published: EP.

\* cited by examiner

SYSTEM AND METHOD FOR AUDIO NOISE REDUCTION

BACKGROUND

A human voice communicated by radio systems is susceptible to a variety of sources of noise interference. For example, a microphone can pick up background noise (e.g. other human voices and noises from systems such as alarm systems) in addition to a desired human voice. Noise can be injected in baseband processing and a RF transmitter of a radio transmitting the voice communications. Such noise can be due to, e.g. inherent thermal noise in electronics used in the radio or from distortion arising from overdriving an amplifier in the radio. Noise can occur in a communications channel between the transmitting radio and the receiving radio, e.g. due to fading, adjacent channel interference from other transmitters, and due to solar activity. Like the transmitting radio, the receiving radio can inject noise, e.g. due to electronics of the receiving radio or distortion such as intermodulation distortion.

In an aircraft, it is important that a pilot readily understand voice communications as originally transmitted to reduce pilot fatigue and avoid catastrophic events. Noise mixed with a human voice audio signal can make the audio signal, heard by the pilot, difficult to understand, or worse unintelligible or even sound incorrect. Further, when a pilot is exposed to noise, it can cause fatigue in the pilot that can reduce his effectiveness and increase the risk of an accident.

Traditional signal processing techniques in radios for reducing noise have limited effectiveness; even with their use, discernable noise is still heard by the pilot. Therefore, there is a need to further reduce such noise so that the pilot is exposed to even less noise, and so the pilot can more readily discern the human voice audio signal that was intended to be received by the pilot.

SUMMARY

A system is provided. The system comprises at least one artificial neural network configured to: receive an audio signal; for a time period, determine if at least one human voice audio spectrum is in the audio signal; for the time period, identify at least one human voice audio power spectrum; for the time period, extract each of the at least one identified human voice audio power spectrum; remove artifacts from each extracted human voice audio power spectrum to synthesize an estimation of an original human voice prior to its distortion; and transmit the synthesized estimation of an original human voice.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding background and summary, or the following detailed description.

Subsequently illustrated exemplary embodiments reduce noise in audio signals. The audio signal may be generated by human beings, musical instruments, voice synthesizers, and/or any other source of an audio signal. The audio signals may be any type of audio signals, e.g. including a human voice and/or music; however, for pedagogical purposes, the audio signal is exemplified as a human voice. The audio signal having reduced noise generated according to embodiments of the invention may or may not be received by a human being, e.g. an operator of a vehicle. Such a vehicle may be an aircraft, a spacecraft, a ship, a submarine, a helicopter, or any other type of vehicle.

Exemplary embodiments use at least one neural network to more effectively remove noise, and replicate, or synthesize, a human voice intended to be transmitted. Embodiments of the invention use neural network(s) to detect and identify a human voice, rather than noise, because there are many more permutations of noise in combination with a human voice than permutations of a human voice.

Figure 1:
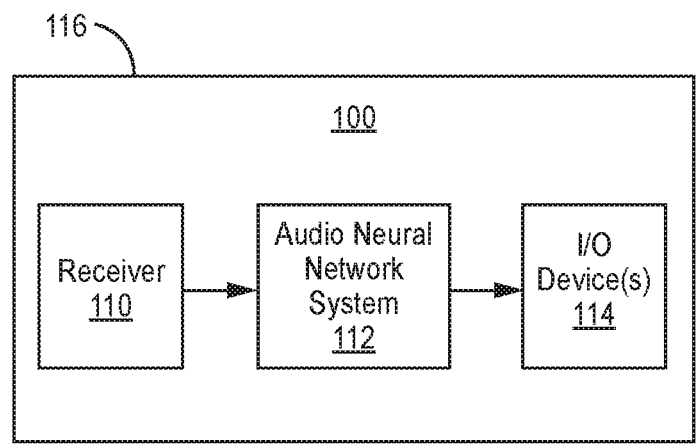
FIG. 1 illustrates a block diagram of one embodiment of a receiver system that receives audio signals in electrical form, and using an embodiment of the invention converts the electrical signals into another form.

FIG. 1 illustrates a block diagram of one embodiment of a receiver system 100 that receives audio signals in electrical form, and using an embodiment of the invention converts the electrical signals into another form. Alternatively, embodiments of the invention can be used in other applications. For example, the techniques illustrated herein can be used to remove background noise picked up by a microphone, e.g. of a cellular telephone or other radio, and to transmit a clearer representation of the human voice.

For example, electrical signals may be converted into sound, e.g. pressure waves, projected by a speaker, and/or visual symbols in a form of text displayed upon a screen of a display. The receiver system 100 comprises a receiver 110, an audio neural network system 112, and at least one input/output device (I/O device(s)) 114. Optionally, the receiver system 100 is in and/or on a vehicle 116. Optionally, the I/O device(s) 114 include headphone(s) worn by pilot(s) on an aircraft.

The receiver 110, e.g. an RF radio receiver and/or a modem, is configured to receive upconverted or baseband audio signals which are electrical signals, e.g. analog or digitized audio signals. The receiver 110 is configured to provide baseband audio signals (or audio signals), in analog or digitized form, at its output. The receiver 110 may include one or more antennas if it is configured to receive electromagnetic signals radiating in free space. The receiver 110 may including at least one amplifier, e.g. low noise amplifier(s) and/or automatic gain control amplifier(s), and filter(s). Optionally, the frequency range of the audio signals may be from 50 Hz to 3.4 kHz; however, the frequency range may be different.

The frequency range of the audio signals may be also referred to hereinafter as the "audio range". The term "human voice audio power spectrum" means a spectrum of human voice audio in the audio range. The term "noisy human voice audio power spectrum" means a spectrum of voice audio and noise in the audio range.

The audio neural network system 112 comprises one or more artificial neural networks. The audio neural network system 112 is configured to receive audio signals, e.g. baseband audio signals that have been demodulated, from the receiver 110. The audio neural network system 112 is also configured to:

a. detect the existence of at least one noisy or noiseless human voice audio power spectrum from one time period to the next, e.g. over successive time periods;
b. during a time period, identify and extract at least one human voice audio power spectrum from the at least one human voice audio power spectrum; and
c. for each time period, remove artifacts from each of the at least one extracted, human voice audio power spectrum so as to synthesize an estimation of an original human voice prior to its distortion by noise during transmission and/or reception.

Each artificial neural network in the audio neural network system 112 comprises a network or circuit of such neurons or nodes. The connection between nodes may be modelled with weights each of which is multiplied by a corresponding input value, and biases (e.g. offset values) each of which may be added to the product of a weight and an input value. Exemplary embodiments of the audio neural network system 112 will be subsequently described.

The human voice can be modelled by a polynomial equation $H(f_n)$ having frequency as its dependent variable. The polynomial equation can be implemented with weighted nodes of the artificial neural network. Using the forward and back-propagation, an artificial neural network can be used to determine connections between nodes, and weights at each node. Such propagation techniques may utilize gradient searching to determine weights and biases and connections that result in a low value of the loss function used. As a result, coefficients of each term of the polynomial equation are determined.

The output of the audio neural network system 112 is coupled to the I/O device(s) 114 to be emitted or displayed. The I/O device(s) 114 may be sound transducer(s) (e.g. speaker system(s) or headphone system(s) which include any necessary data conversion and amplification systems) and/or a display system (which would include voice to text translator circuitry and a display, e.g. an LCD or OLED display). Optionally, the output of the I/O device(s) 114 are configured to be heard by and/or read, e.g. by an operator of the vehicle, for example a pilot.

Figure 2:
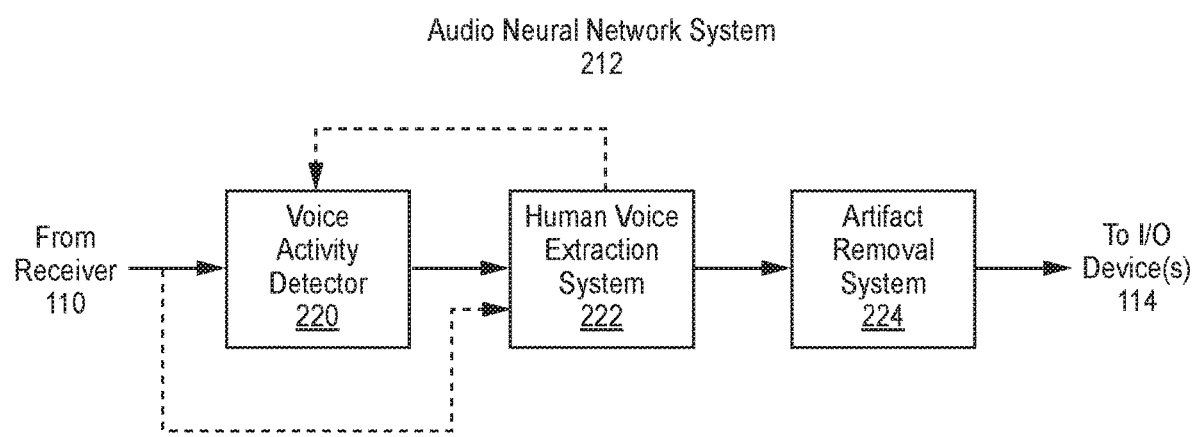
FIG. 2 illustrates a block diagram of one embodiment of an audio neural network system.

FIG. 2 illustrates a block diagram of one embodiment of the audio neural network system 212. The operation of each block will now be subsequently described.

The audio neural network system 212 comprises a voice activity detector 220, a human voice extraction system 222, and an artifact removal system 224. As will be subsequently illustrated, optionally, each of the voice activity detector 220, the human voice extraction system 222, and the artifact removal system 224 may be implemented with separate artificial neural networks. However, alternatively, all of the aforementioned components of the audio neural network system 212 may be implemented by one, two, four or more artificial neural networks. The artificial neural network(s) of each of the aforementioned components may be trained separately, or the all of the artificial neural network of all components may be trained together as a single system. Optionally, the audio neural network system 212 may perform the collective functions described herein for each of the voice activity detector 220, the human voice extraction system 222, and the artifact removal system 224—without necessarily incorporating such components.

The voice activity detector 220 is configured to receive an audio signal, e.g. from the receiver 110. Additionally or alternatively, the voice activity detector 220 may receive the audio signal from a different source, e.g. memory circuitry which holds recorded audio for example a flight recorder.

The voice activity detector 220 is further configured to determine whether an audio signal in a time period includes at least one human voice audio power spectrum. Each of such human voice audio power spectra may be noisy or noiseless. Optionally, if the voice activity detector 220 is implemented with its own artificial neural network, the voice activity detector 220 may be implemented with a recurrent neural network; however, the voice activity detector 220 may alternatively be implemented with one or more other types of neural networks such as, but not limited to, those others referred to herein.

The human voice extraction system 222 is configured to receive an audio signal from the human voice activity detector 220 or the receiver 110, and to receive information from the voice activity detector 220 whether at least one human voice audio power spectrum (noisy or noiseless) exists in each time period. The human voice extraction system 222 is further configured to generate known human voice audio power spectra, or masks, corresponding to the human voices which are used to train the artificial neural networks described herein. The human voice extraction system 222 is further configured to identify known human voice audio power spectrum using such masks corresponding to identified noisy or noiseless human voice audio power spectrum when the correlation coefficient(s) between the noisy or noiseless human voice audio power spectrum and its mask exceeds threshold value(s). In one embodiment, the human voice extraction system 222 only performs identification for an audio signal during a time period if the voice activity detector 220 determines such audio signal includes at least one human voice audio power spectrum. However, alternatively, the human voice extraction system 222 performs identification for all audio signals of all time periods.

The identification is accomplished by comparing known human voice audio power spectra (or masks) against the each noisy or noiseless human voice audio power spectrum, e.g. in frequency sub-band(s) (or sub-band(s)), and identifying known human voice audio power spectrum having the highest correlation with an noisy or noiseless human voice audio power spectrum. Optionally, for identification to be completed, the correlation coefficient(s) between a mask and an identified human voice audio power spectrum must exceed of a threshold value(s).

During each time period, the human voice extraction system 222 is also configured to extract a human voice audio power spectrum from each noisy or noiseless human voice audio power spectrum. The extracted human voice audio power spectrum is the identified noisy human voice audio power spectrum with noise removed. However, each extracted human voice audio power spectrum is likely a distorted version of the corresponding mask, with which it has a high correlation, because the removed noise portion obscured portion(s) of the original voice audio power spectrum. Thus, portion(s) of original human voice may be absent. Optionally, if the human voice extraction system 222 is implemented with its own artificial neural network, the human voice extraction system 222 may be implemented with a modified convolutional neural network (like a convolutional encoder-decoder network); however, the human voice extraction system 222 may alternatively be implemented with one or more other types of neural networks such as, but not limited to, those others referred to herein. A modified convolutional neural network is a convolutional neural network that has been modified to identify location of features.

Optionally, the human voice extraction system 222 provides feedback to the voice activity detector 220. If the human voice extraction system 222 determines that there is one or more human voice audio power spectrum in an audio signal during a time period during which the voice activity detector 220 determined that there was no human voice audio power spectra in the time period, then the human voice extraction system 222 provides such information to the voice activity detector 220. Optionally, the human voice extraction system 222 may provide feedback to the voice activity detector 220 when the human voice extraction system 222 is unable to extract a human voice audio power spectrum from an audio signal during a time period during which the voice activity detector 220 determined that there was at least one human voice audio power spectra. Upon receipt of such information, the voice activity detector 220 uses such information to modify its neural network(s) to improve their ability to detect human voice audio power spectra.

The artifact removal system 224 is coupled to the human voice extraction system 222, and is configured to receive at least one extracted human voice audio power spectrum during a time period. The artifact removal system 224 modifies each extracted human voice audio power spectrum so that it replicates the identified known human voice power spectrum (or mask) identified by the human voice extraction system 222. As a result, the frequency content and/or the amplitude of the extracted voice audio power spectrum is modified to replicate the mask. As a result, an estimation of an original human voice (prior to its distortion) is synthesized creating a replicated human voice audio power spectrum; the estimation diminishes distortion in the replicated human voice audio power spectrum. Optionally, the output of the artifact removal system 224 is coupled to the I/O device(s) 114.

Optionally, if the artifact removal system 224 is implemented with its own artificial neural network, the artifact removal system 224 may be implemented with a generative adversarial neural network system; however, the artifact removal system 224 may alternatively be implemented with one or more other types of artificial neural networks such as, but not limited to, those others referred to herein. A generative adversarial neural network system comprises a system of two artificial neural networks contesting each other in a zero-sum game framework. One (generative) neural network generates candidates (generative) and the other (discriminative) neural network evaluates such candidates. In one embodiment, once the generative adversarial neural network is trained, only the generative portion would be retained; the discriminative part would be discarded.

Prior to being used with non-training audio samples, the one or more artificial neural networks of the audio neural network system 212 must be trained with a wide variety of human voice audio samples with and without noise (training samples). For example, for each human voice audio sample, a sample (clean sample) with no or little noise, and numerous samples of the human voice audio sample (noisy samples) with different types of noises, are provided. The one or more artificial neural networks, e.g. of the audio neural network system 212, are trained with such clean and noisy human voice audio samples using the aforementioned forward and back-propagation technique. The noisy human voice audio samples include very many different combinations of noise with each human voice audio sample.

The artificial neural networks described herein may be implemented in a hardware artificial neural network including reconfigurable hardware nodes whose interconnects between one another may be varied. Alternatively, the artificial neural networks described herein may be implemented in software on a state machine, e.g. a processing system comprising processing circuitry coupled to memory circuitry.

Figure 3:
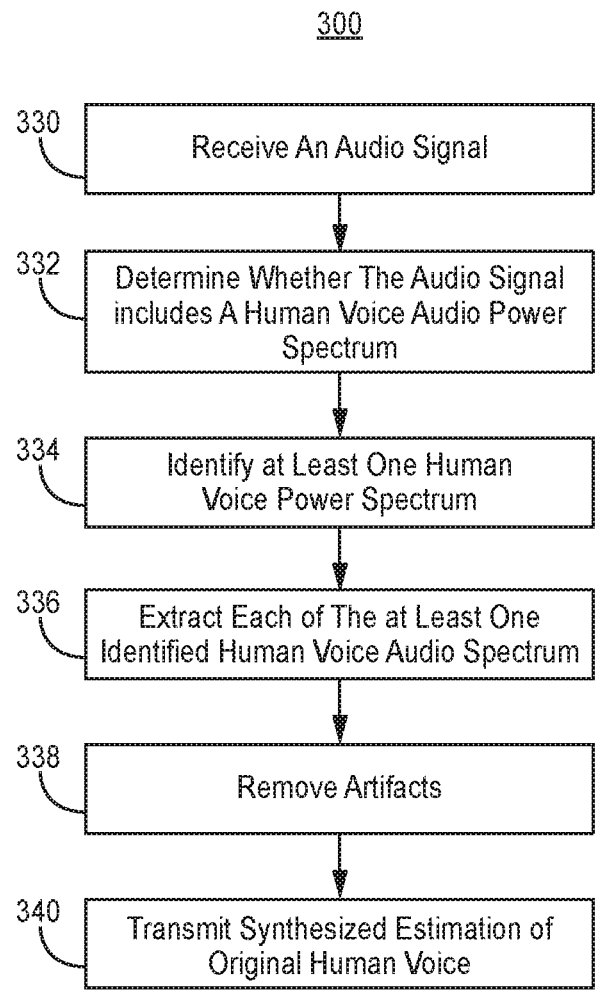
FIG. 3 illustrates a flow diagram of one embodiment of a method for reducing noise.

FIG. 3 illustrates one embodiment of a method 300 for reducing noise. To the extent that the embodiment of method 300 shown in FIG. 3 described herein as being implemented in the systems shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 330, receive a baseband audio signal (or an audio signal), e.g. from a receiver. In block 332, determine whether the audio signal in a time period includes a human voice audio power spectrum. Then, proceed to block 334. Optionally, if no human voice audio power spectrum is determined to be in the audio signal during the time period, then return to block 332 to perform the same analysis for a subsequent time period. Optionally, if human voice audio power spectrum is determined to be in the audio signal during the time period, then in block 334, identify at least one human voice audio power spectrum (noisy or noiseless) from the audio signal during the time period, e.g. using correlation as discussed above. In block 336, extract at least one identified human voice audio power spectrum from the audio signal during the time period. Optionally, prior to performing the identifying block, the audio signal in a frequency domain is partitioned into sub-bands; then when performing the identifying block, identify at least one human voice audio power spectrum in at least one sub-band. Optionally when performing the extracting block, extract the identified at least one human voice audio power spectrum in each sub-band.

In block 338, remove artifacts from each of the at least one extracted human voice power spectrum to synthesize an estimation of an original human voice prior to its distortion. Optionally, modify each of the extracted at least one identified human voice audio power spectrum to match a corresponding correlated human voice model. In block 340, transmit the synthesized estimation of the original human voice, e.g. to at least one I/O device, for example for broadcast and/or display.

A processing system used in the present system and method can be implemented using software, firmware, hardware, or any appropriate combination thereof, as known to one of skill in the art. By way of example and not limitation, the processing circuitry can include one or more of each of microprocessor circuitry, microcontroller circuitry, Digital Signal Processors (DSP) circuitry, Application Specific Integrated Circuits (ASICs), programmable logic device circuitry, and/or Field Programmable Gate Array (FPGA) circuitry. The processing system can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

Suitable computer readable media may include storage or memory media such as the memory circuitry illustrated herein. For example, the memory circuitry may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RAM (SRAM)), Read Only Memory (ROM), Electrically Erasable Programmable ROM (EEPROM), and Flash memory.

Exemplary Embodiments

Example 1 includes a system, comprising: at least one artificial neural network configured to: receive an audio signal; for a time period, determine if at least one human voice audio spectrum is in the audio signal; for the time period, identify at least one human voice audio power spectrum; for the time period, extract each of the at least one identified human voice audio power spectrum; remove artifacts from each extracted human voice audio power spectrum to synthesize an estimation of an original human voice prior to its distortion; and transmit the synthesized estimation of an original human voice.

Example 2 includes the system of Example 1, further comprising a receiver coupled to the at least one artificial neural network, and configured to provide the audio signal received by the at least one artificial neural network.

Example 3 includes the system of any of Examples 1-2, further comprising at least one input/output device coupled to the at least one artificial neural network, and configured to receive the transmitted synthesized estimation of the original human voice.

Example 4 includes the system of any of Examples 1-3, wherein the at least one input/output device comprises at least one of a speaker or a display.

Example 5 includes the system of any of Examples 1-4, wherein the determining if at least one human voice audio spectrum is in the audio signal is performed by a recurrent neural network.

Example 6 includes the system of any of Examples 1-5, wherein the identifying and extracting of each of the at least one identified human voice audio power spectrum is performed by a modified convolutional neural network.

Example 7 includes the system of any of Examples 1-6, wherein the removing of artifacts is performed by a generative adversarial neural network.

Example 8 includes the system of any of Examples 1-7, wherein the at least one artificial neural network is configured to be trained with clean and noisy human voice audio training samples prior to receiving an audio signal that is not a training sample.

Example 9 includes a method, comprising: receiving an audio signal; for a time period, determining if at least one human voice audio spectrum is in the audio signal; for the time period, identifying at least one human voice audio power spectrum; extracting each of the at least one identified human voice audio power spectrum; removing artifacts from each extracted human voice audio power spectrum to synthesize an estimation of an original human voice prior to its distortion; and transmitting the synthesized estimation of the original human voice.

Example 10 includes the method of Example 9, wherein the determining if at least one human voice audio spectrum is in the audio signal is performed by a recurrent neural network.

Example 11 includes the method of any of Examples 9-10, wherein the identifying and extracting of at least one human voice power spectrum is performed by a modified convolutional neural network.

Example 12 includes the method of any of Examples 9-11, wherein the removing of artifacts is performed by a generative adversarial neural network.

Example 13 includes the method of any of Examples 9-13, further comprising training with clean and noisy human voice audio samples prior to receiving an audio signal that is not a training sample.

Example 14 includes the method of any of Examples 9-13, further comprising generating signals configured to be used to at least one of: emit sound of the synthesized estimation of the original human voice; and display the synthesized estimation of the original human voice.

Example 15 includes a method, comprising: receiving an audio signal; determining if frequency spectrum of the audio signal includes at least one human voice audio spectrum; and if the frequency spectrum is determined to include at least one human voice audio spectrum, then: partitioning the frequency spectrum into sub-bands; identifying at least one human voice audio spectrum in at least one sub-band that is correlated to a human voice model; extracting each of the at least one identified human voice audio spectrum; and modifying each of the at least one extracted human voice audio spectrum to match the corresponding correlated human voice model.

Example 16 includes, the method of Example 15, wherein the determining if at least one human voice audio spectrum is in the audio signal is performed by a recurrent neural network.

Example 17 includes the method of any of Examples 15-16, wherein the identifying and extracting of at least one human voice power spectrum is performed by a modified convolutional neural network.

Example 18 includes the method of any of Examples 15-17, wherein the removing of artifacts is performed by a generative adversarial neural network.

Example 19 includes the method of any of Examples 15-18, further comprising training with clean and noisy human voice audio samples prior to receiving an audio signal that is not a training sample.

Example 20 includes the method of any of Examples 15-19, further comprising generating signals configured to be used to at least one of: emit sound of the synthesized estimation of the original human voice; and display the synthesized estimation of the original human voice.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
   at least one artificial neural network configured to:
   receive an audio signal;
   determine that at least one human voice audio power spectrum is in the audio signal during a time period;
   upon determining that at least one human voice audio power spectrum is in the audio signal, then identify, using known human voice audio power spectra, at least one human voice audio power spectrum in the audio signal during the time period;
   extract the at least one identified human voice audio power spectrum;
   remove artifacts from each of the at least one extracted human voice audio power spectrum to synthesize an estimation of an original human voice prior to its distortion; and
   transmit the synthesized estimation of an original human voice.

2. The system of claim 1, further comprising a receiver coupled to the at least one artificial neural network, and configured to provide the audio signal received by the at least one artificial neural network.

3. The system of claim 1, further comprising at least one input/output device coupled to the at least one artificial neural network, and configured to receive the transmitted synthesized estimation of the original human voice.

4. The system of claim 1, wherein the at least one input/output device comprises at least one of a speaker or a display.

5. The system of claim 1, wherein the determining if at least one human voice audio power spectrum is in the audio signal is performed by a recurrent neural network.

6. The system of claim 1, wherein the identifying and the extracting of at least one identified human voice audio power spectrum is performed by a modified convolutional neural network.

7. The system of claim 1, wherein the removing of artifacts is performed by a generative adversarial neural network.

8. The system of claim 1, wherein the at least one artificial neural network is configured to be trained with clean and noisy human voice audio training samples prior to receiving an audio signal that is not a training sample.

9. A method, comprising:
   receiving an audio signal;
   determining that at least one human voice audio power spectrum is in the audio signal during a time period;
   upon determining that at least one human voice audio power spectrum is in the audio signal, then identifying at least one human voice audio power spectrum in the audio signal during the time period;
   extracting the at least one identified human voice audio power spectrum;
   removing artifacts from each of the at least one extracted human voice audio power spectrum to synthesize an estimation of an original human voice prior to its distortion; and
   transmitting the synthesized estimation of the original human voice.

10. The method of claim 9, wherein the determining if at least one human voice audio power spectrum is in the audio signal is performed by a recurrent neural network.

11. The method of claim 9, wherein the identifying and extracting of at least one human voice power spectrum is performed by a modified convolutional neural network.

12. The method of claim 9, wherein the removing of artifacts is performed by a generative adversarial neural network.

13. The method of claim 9, further comprising training with clean and noisy human voice audio samples prior to receiving an audio signal that is not a training sample.

14. The method of claim 9, further comprising generating signals configured to be used to at least one of:
   emit sound of the synthesized estimation of the original human voice; and
   display the synthesized estimation of the original human voice.

15. A method, comprising:
   receiving an audio signal;
   determining if frequency spectrum of the audio signal includes at least one human voice audio power spectrum; and
   upon determining that the frequency spectrum includes at least one human voice audio power spectrum, then:
   partitioning the frequency spectrum into sub-bands;
   identifying, using known human voice audio power spectra, at least one human voice audio power spectrum in at least one sub-band that is correlated to a human voice model;
   extracting each of the at least one identified human voice audio power spectrum; and
   modifying each of the at least one extracted human voice audio power spectrum to match a corresponding correlated human voice model.

16. The method of claim 15, wherein the determining if at least one human voice audio power spectrum is in the audio signal is performed by a recurrent neural network.

17. The method of claim 15, wherein the identifying and extracting of at least one human voice power spectrum is performed by a modified convolutional neural network.

18. The method of claim 15, wherein the removing of artifacts is performed by a generative adversarial neural network.

19. The method of claim 15, further comprising training with clean and noisy human voice audio samples prior to receiving an audio signal that is not a training sample.

20. The method of claim 15, further comprising generating signals configured to be used to at least one of:
   emit sound of the synthesized estimation of the original human voice; and
   display the synthesized estimation of the original human voice.

* * * * *